United States Patent [19]

O'Loughlin et al.

[11] Patent Number: 5,086,550
[45] Date of Patent: Feb. 11, 1992

[54] METHOD OF ASSEMBLING AN INFLATOR FOR A VEHICLE OCCUPANT RESTRAINT

[75] Inventors: John P. O'Loughlin; Conrad M. Novak, both of Mesa, Ariz.

[73] Assignee: TRW Inc., Lyndhurst, Ohio

[21] Appl. No.: 629,482

[22] Filed: Dec. 18, 1990

[51] Int. Cl.⁵ .............................. B23P 15/16
[52] U.S. Cl. .................. 29/163.8; 29/163.6; 29/902
[58] Field of Search ............ 29/163.6, 163.8, 902

[56] References Cited

U.S. PATENT DOCUMENTS

| | | | |
|---|---|---|---|
| 3,026,609 | 3/1962 | Bryan | 29/163.8 X |
| 4,017,100 | 4/1977 | Gehrig et al. | |
| 4,082,071 | 4/1978 | Jones | 29/163.8 X |
| 4,169,059 | 9/1979 | Storms | 29/163.8 X |
| 4,268,289 | 5/1981 | Polaner | 29/163.8 X |
| 4,322,230 | 3/1982 | Schoen et al. | 29/163.8 X |
| 4,322,385 | 3/1982 | Goetz | |
| 4,714,486 | 12/1987 | Silverthorn | 29/163.8 X |
| 4,878,690 | 11/1989 | Cunningham | |
| 4,902,036 | 2/1990 | Zander et al. | |
| 4,969,994 | 11/1990 | Misgen et al. | 29/163.8 X |

FOREIGN PATENT DOCUMENTS 1476731  6/1977  United Kingdom ............ 29/163.8

Primary Examiner—Timothy V. Eley
Assistant Examiner—C. Richard Martin
Attorney, Agent, or Firm—Tarolli, Sundheim & Covell

[57] ABSTRACT

A method of assembling an inflator for a vehicle occupant restraint is disclosed. The inflator comprises a housing that provides a gas flow path, a filter that includes a plurality of successive filter layers extending across the flow path, and a seal that is disposed between the housing and the filter. The method comprises the step of assembling the seal and filter by embedding a part of the filter into the material of the seal to provide a sealing relationship between the seal and filter. Thereafter, the preassembled filter and seal is positioned in the housing.

17 Claims, 3 Drawing Sheets

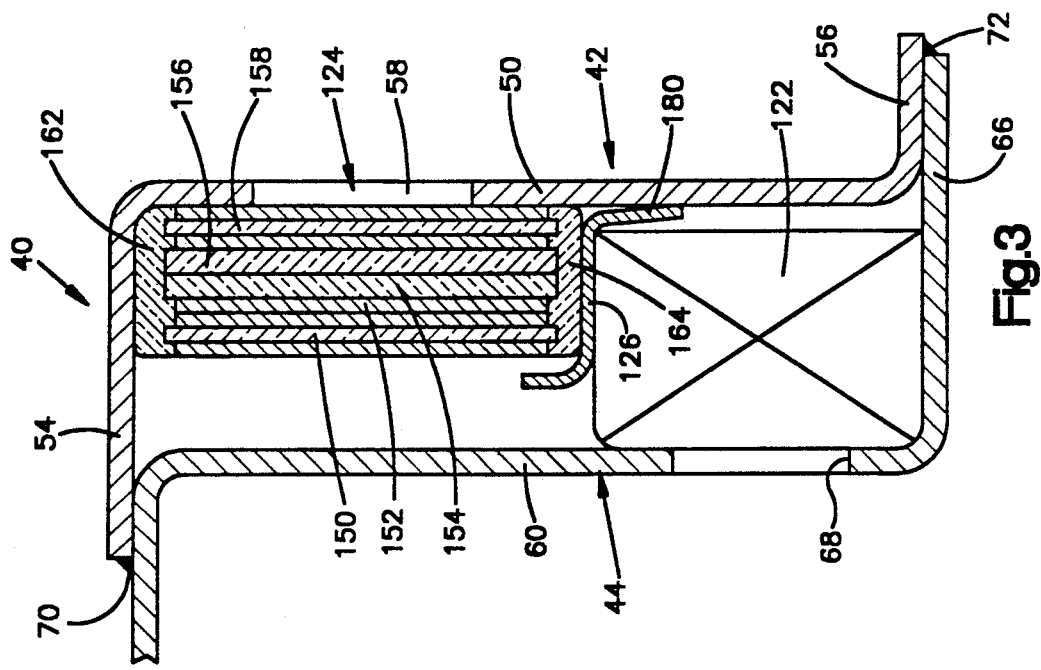
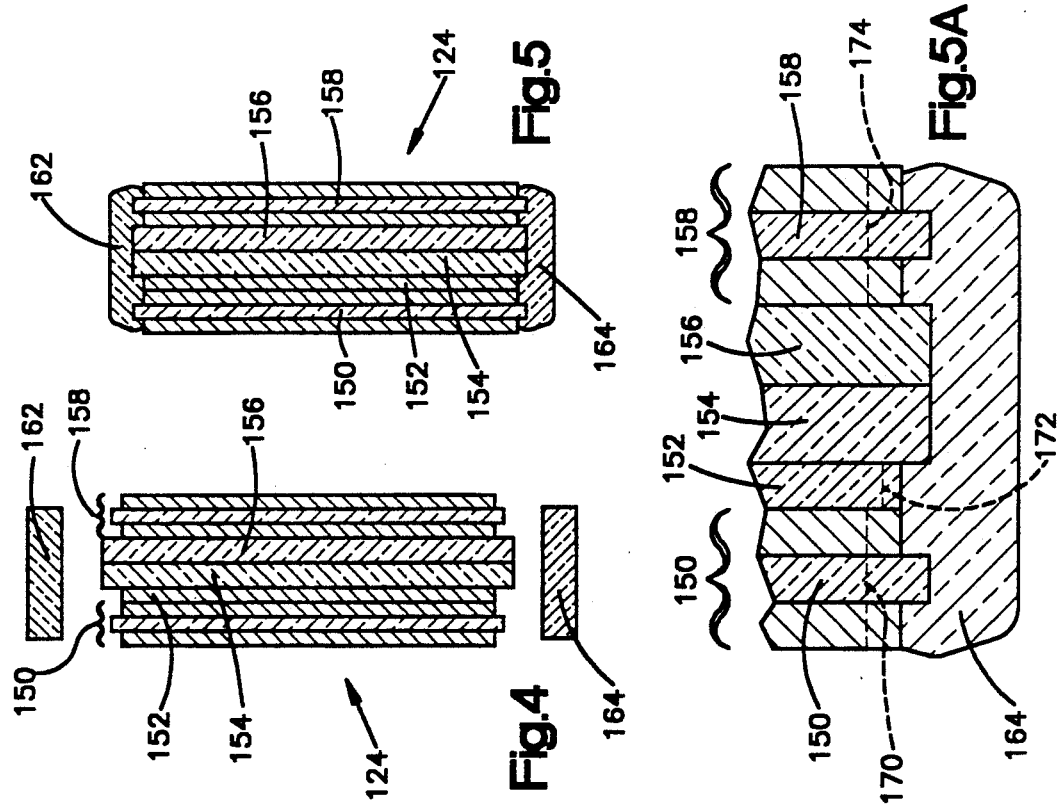

METHOD OF ASSEMBLING AN INFLATOR FOR A VEHICLE OCCUPANT RESTRAINT

BACKGROUND OF THE INVENTION

1. Technical Field

The present invention relates to a method of assembling an inflator for a vehicle occupant restraint, such as an air bag.

2. Description of the Prior Art

The use of an air bag to restrain movement of an occupant of a vehicle when the vehicle encounters a sudden deceleration, such as in a collision, is well known. The air bag is inflated by gas generated by activation of gas generating material. The gas generating material is contained in an inflator housing.

A commonly used gas generating material contains an alkali metal azide and a metal oxide, such as cupric oxide or iron oxide. Ignition of the gas generating material produces a hot gas stream. The hot gas stream will typically include nitrogen gas, molten metal, sodium oxide, a sodium salt of the metal, and metal nitride. The nitrogen gas carries the other reaction products which are in the form of a residue or sinter.

A problem facing the air bag industry has been the development of an effective, low cost, mechanical filter for filtering the residue and the sinter from the hot gas stream. The filter must be capable of removing the residue and the sinter from the gas before it enters the bag. The filter also should be capable of cooling the gas stream. A portion of the filter may have a reactant surface of an acidic oxide, such as silicon dioxide, to react with and neutralize the sodium oxide in the hot gas stream. To achieve these objectives, a seal must be provided between the filter and the inflator housing, so that all of the hot gas stream is directed through the filter.

U.S. Pat. No. 4,902,036, discloses an inflator or gas generator for a vehicle occupant restraint. The inflator contains a plurality of filters including a final filter assembly which cools and filters the gas before the gas exits from the generator into an air bag. The final filter assembly comprises a first section of mesh screens. The mesh screens remove particulate reaction products from the gas stream. The final filter assembly also has a second section of mesh screens of smaller mesh size than the first section of mesh screens. The mesh screen sections are separated from each other by a spacer pad of a ceramic fiber that is a mixture of aluminum oxide and silicon dioxide. The spacer pad is sold under the trademark "Fiberfrax" by Sohio Carborundum, Inc. It is also known to have the foregoing final filter assembly seal against the generator housing by pressing graphite seals (not shown in the patent) between the housing and the upper and lower edges of the filter.

U.S. Pat. No. 4,878,690 also discloses a filter assembly used in an inflator for a vehicle occupant restraint. The filter assembly comprises, in the direction of gas flow, a plurality of layers of 28 mesh stainless steel screen, a filter member for fine filtering the generated gas, and then another layer of 28 mesh stainless steel screen. The filter member can be an alumina-silica fiber paper such as "Lytherm" ceramic fiber paper marketed by Mansville Co. Other examples of filter paper disclosed in the patent are silica fiber paper marketed by Sandtex Corporation of Japan under the trademark "Sandtex" and a filter material sold by National Standard Co. of Corbin, Ken. under the trademark "FIBREX". There is no disclosure in the patent as to how the filter assembly is sealed against the housing for the inflator.

SUMMARY OF THE INVENTION

The present invention resides in a method of assembling an inflator for a vehicle occupant restraint. The inflator comprises a housing providing a gas flow path, a filter comprising a plurality of successive filter layers extending across the flow path, and a seal between the housing and the filter. The method comprises the steps of assembling the seal and filter by embedding a part of the filter into the material of the seal to provide a sealing relationship between the seal and filter and, thereafter, positioning the preassembled filter and seal in the housing.

Preferably, the seal is a graphite seal, and a part of the filter which is embedded into the material of the seal is a layer of metal felt. Also, the filter preferably comprises a porous ceramic mat and a plurality of metal mesh layers. The porous ceramic mat is also preferably embedded in the material of the seal, and the material of the seal is extruded into the layers of metal mesh.

An advantage of the present invention is that the preassembled filter and seal can be tested for seal effectiveness before positioning the subassembly in the inflator housing. If the seal is tested after assembly in the inflator housing and is defective, the inflator must be substantially disassembled for repair.

BRIEF DESCRIPTION OF THE DRAWINGS

Further features of the present invention will become apparent to those skilled in the art to which the present invention relates from reading the following specification with reference to the accompanying drawings, in which:

FIG. 3 is an enlarged sectional view of a portion of the inflator of FIG. 2 showing the filter of the present invention sealed within the inflator housing;

FIG. 4 is an enlarged sectional view of the filter of FIG. 3 and the seals for the filter prior to preassembling the filter and seals;

FIG. 5 is an enlarged sectional view of the filter and seals of FIG. 4 after preassembling the filter and seals; and FIG. 5A is a further enlarged sectional view of a portion of FIG. 5.

DESCRIPTION OF A PREFERRED EMBODIMENT OF THE INVENTION

Figure 1:
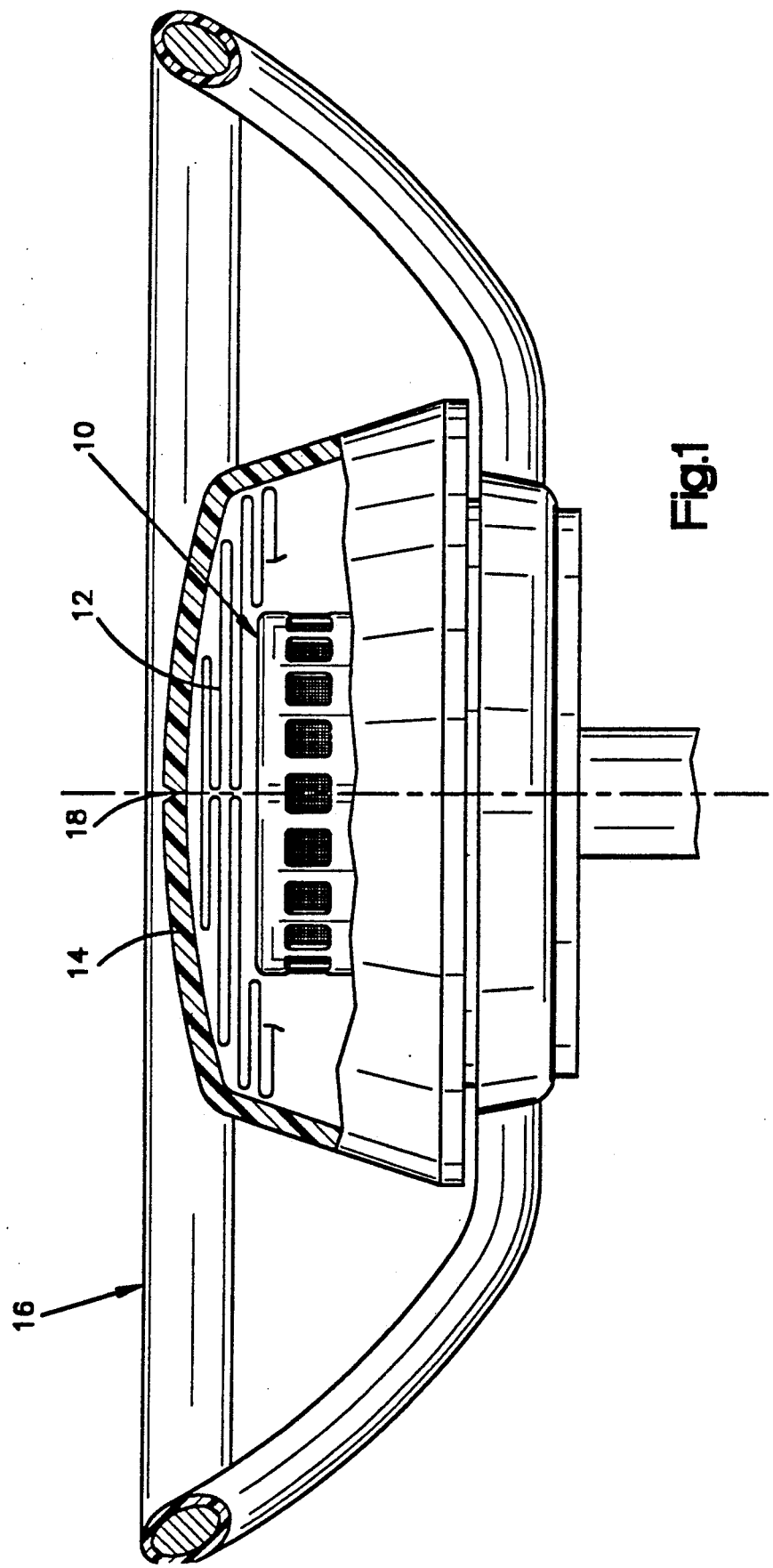
FIG. 1 is a transverse view, partially in section, of a vehicle steering wheel with an inflatable occupant restraint module incorporating an inflator constructed in accordance with the present invention.

The present invention relates to an air bag inflator and particularly to an inflator for inflating an air bag to protect the driver of a vehicle. The present invention is applicable to various inflator constructions. As representative of the present invention, FIG. 1 illustrates an inflator 10. An air bag 12 is folded around the inflator 10. A cover 14 encloses the air bag 12 and the inflator 10. The inflator 10, the air bag 12, and the cover 14 form a module which is mounted on a vehicle steering wheel 16.

Upon the occurrence of sudden vehicle deceleration, such as occurs in a collision, the inflator 10 is energized and produces a large volume of gas. The flow of gas from the inflator 10 expands the air bag 12. As the air bag 12 starts to expand, it breaks weakened portions in the cover 14. One of the weakened portions is designated 18 in FIG. 1. As the air bag 12 continues to expand, it moves into the space between the driver of the vehicle and the steering wheel 16 to restrain movement of the driver, as is known.

Figure 2:
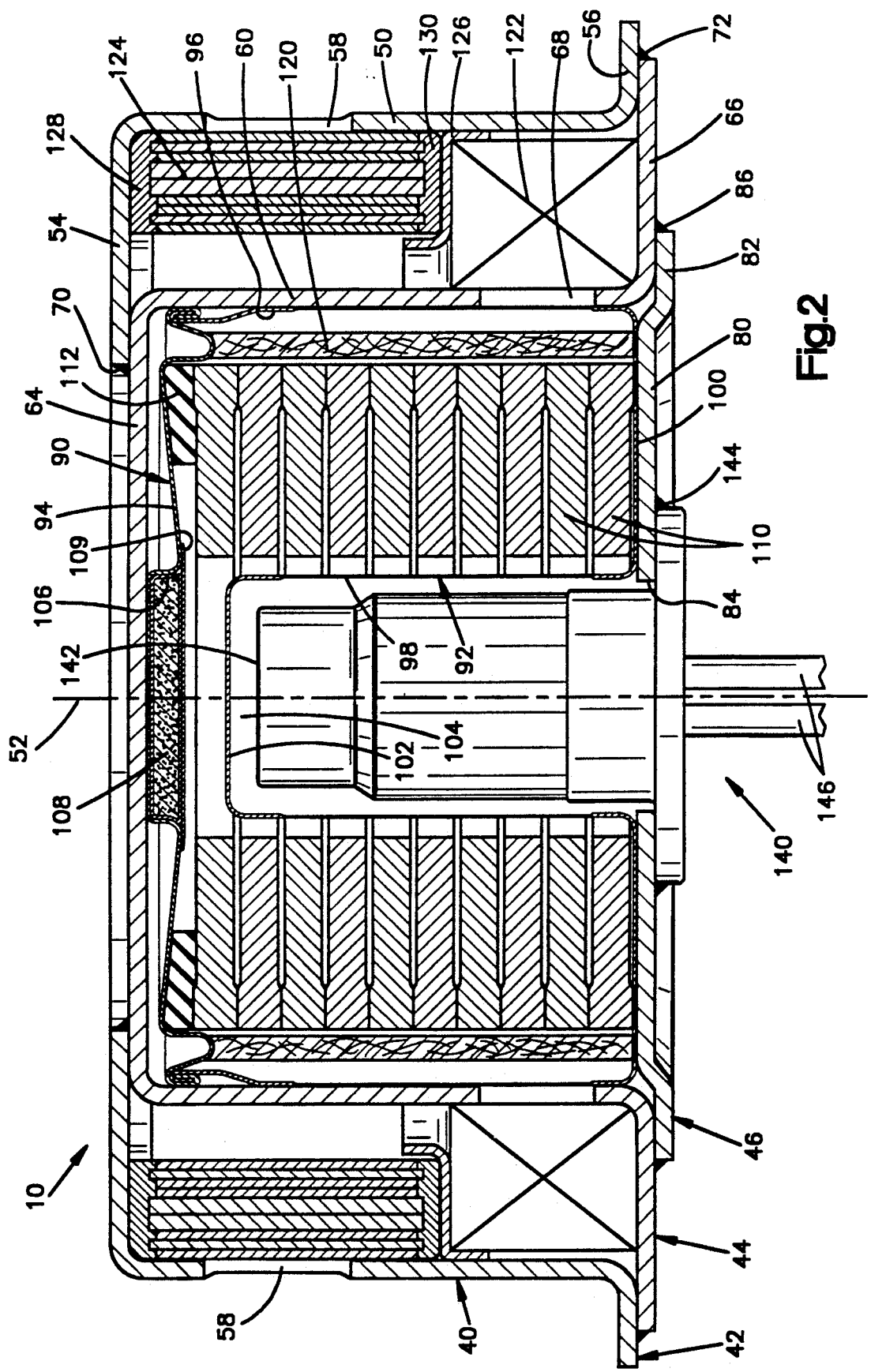
FIG. 2 is a transverse view, partially in section, of the inflator of FIG. 1.

The inflator 10 (FIG. 2) includes a housing 40. The housing 40 is made of three pieces, namely, a diffuser cup 42, a combustion cup 44, and a combustion chamber cover 46. The diffuser cup 42, the combustion cup 44, and the combustion chamber cover 46 are made of a metal, such as UNS S30100 stainless steel.

The diffuser cup 42 is generally cup-shaped and has a cylindrical side wall 50 extending around the central axis 52 of the inflator 10. The side wall 50 extends between a flat upper end wall 54 and a flat lower flange 56. The end wall 54 and the flange 56 are generally parallel to each other and perpendicular to the axis 52. An annular array of gas outlet openings 58 extends circumferentially around an upper portion of the diffuser cup side wall 50.

The combustion cup 44 is generally cup-shaped and is disposed inside the diffuser cup 42. The combustion cup 44 has a cylindrical side wall 60 extending around the axis 52. The cylindrical side wall 60 extends between a flat upper end wall 64 and a flat lower flange 66. The upper end wall 64 and the lower flange 66 are generally parallel to each other and perpendicular to the axis 52. An annular array of openings 68 extends circumferentially around a lower portion of the combustion cup side wall 60.

The upper end wall 64 of the combustion cup 44 is welded with a continuous weld to the upper end wall 54 of the diffuser cup 42 at a circumferential weld location 70, preferably by laser welding. The combustion cup flange 66 is welded with a continuous weld to the diffuser cup flange 56 at a circumferential weld location 72, also preferably by laser welding.

The combustion chamber cover 46 is a generally flat metal piece having a circular center portion 80 and a parallel but offset annular outer flange 82. A circular opening 84 is located in the center portion 80 of the chamber cover 46. The outer flange 82 of the chamber cover 46 is welded with a continuous weld to the combustion cup flange 66 at a circumferential weld location 86, again preferably by laser welding.

A hermetically sealed canister 90 is disposed in the combustion cup 44. The canister 90 is made of two pieces, namely, a lower canister section 92 and a cover 94. The radially outer edge of the canister cover 94 is crimped to an adjacent edge of the canister lower section 92 to seal the canister 90 hermetically. The canister 90 is preferably made of relatively thin aluminum.

The canister lower section 92 has a cylindrical outer side wall 96 adjacent to and inside the combustion chamber side wall 60. The side wall 96 has a reduced thickness in the area adjacent the openings 68 in the combustion cup side wall 60. The canister lower section 92 also has a cylindrical inner side wall 98 spaced radially inward from the outer side wall 96. The side wall 98 has a reduced thickness in the area adjacent an igniter 142.

A flat ring-shaped lower wall 100 of the canister lower section 92 interconnects the outer side wall 96 and the inner side wall 98. A circular inner top wall 102 of the canister lower section 92 extends radially inward from and caps the inner side wall 98. The inner top wall 102 and the cylindrical inner side wall 98 define a downwardly opening central recess 104 in the canister 90.

The canister cover 94 is generally circular in shape. A recess 106 is located in the center of the canister cover 94. A packet 108 of auto ignition material is located in the recess 106 and held in the recess 106 by a piece of aluminum foil tape 109.

A plurality of annular disks 110 of gas generating material are stacked atop each other within the canister 90. An annular cushion 112 is disposed between the uppermost gas generating disk 114 and the inside of the canister cover 94. The disks 110 are made of a known material which when ignited generates nitrogen gas. Although many types of gas generating material could be used, suitable gas generating materials are disclosed in U.S. Pat. No. 3,895,098. A preferred gas generating material is one containing sodium azide. The sodium azide, on combustion, forms sodium oxide.

An annular prefilter 120 is disposed in the canister 90. The prefilter 120 is located radially outward of the gas generating disks 110 and inside the outer side wall 96 of the canister 90. A small annular space exists between the prefilter 120 and the outer side wall 96.

An annular slag screen indicated schematically at 122 is located in the diffuser cup 42, outside of the combustion cup 44. The slag screen 122 is disposed radially outward of the openings 68 and lies against the combustion cup side wall 60. However, the slag screen 122 could be spaced away from the openings 68 in the combustion cup side wall 60.

An annular final filter 124 is located inside the diffuser cup 42 above the slag screen 122. The final filter 124 is radially inward of the gas outlet openings 58 in the side wall 50 of the diffuser cup 42. The final filter 124 is a plurality of layers of various materials, to be described. The layers extend around the diffuser cup side wall 50 and are located inside the side wall.

An annular filter shield 126 projects radially inward from the diffuser cup side wall 50 and separates the final filter 124 and the slag screen 122. The filter shield 126 is secured to the diffuser cup side wall 50 by below.

The inflator 10 includes an initiator assembly 140. The initiator assembly 140 includes the igniter 142 which projects through the opening 84 in the chamber cover 46 into the central recess 104 of the canister 90. The initiator assembly 140 is welded with a continuous weld, preferably a laser weld, to the center portion 80 of the chamber cover 46 at a circumferential weld location 144.

The igniter 142 includes a pair of wire leads 146 which extend outwardly from the initiator assembly 140. The wire leads 146 are connectable to a collision sensor (not shown). Inside the igniter 142, the wire leads 146 are connected to a resistance wire embedded in an ignition material. A thin plastic film (not shown) is located on the outside of the upper portion of the igniter 142, to prevent metal-to-metal contact which could ground the igniter 142 and disable the inflator 10. The igniter 142 may be of any suitable well known construction.

Upon the occurrence of a collision or other sudden vehicle deceleration, the collision sensor closes an electrical circuit. An electrical current then flows through the wire leads 146 to the igniter 142. The resistance wire heats and ignites the igniter 142. Ignition of the igniter 142 forms hot gas products which flow outwardly from the igniter 142 and rupture the inner top wall 102 and the inner side wall 98 of the canister 90. The hot gas from the igniter 142 ignites the disks 110 of gas generating material. The disks 110 of gas generating material rapidly produce a large volume of hot gas.

The gas pressure acts on the cylindrical side wall 96 of the canister 90, forcing the side wall 96 radially outward against the combustion cup side wall 60. This results in the thin side wall 96 of the canister 90 being ruptured or blown out at the openings 68 in the combustion cup side wall 60. The reduced thickness of the side wall 96 adjacent the openings 68 allows this portion of the side wall 96 to rupture in preference to other portions at a desired pressure. The gas generated by burning of the disks 110 then flows radially outward through the prefilter 120. The prefilter 120 removes from the flowing gas some coarse particulates and other combustion products of the initiator assembly 140 and of the gas generating disks 110. The prefilter 120 also cools the gas, and molten combustion products plate on the prefilter. The gas flows through the openings 68 and into the slag screen 122.

The slag screen 122 removes and traps particles from the flowing gas. The slag screen also cools the flowing gas. When the gas cools, molten combustion products such as metal are plated onto the slag screen 122. The filter shield 126 between the slag screen 122 and the final filter 124 causes turbulent flow of gas to occur in and around the slag screen 122. The turbulent gas flow promotes the retention of relatively heavy particles in the slag screen 122 and in the lower portion of the diffuser cup 42.

The gas flows axially upwardly from the slag screen 122 to the final filter 124. The gas then flows radially outwardly through the final filter 124 and annular array of gas outlet openings 58 into the air bag 12 to inflate the air bag 12.

The final filter 124 functions to remove small particles from the gas. The final filter 124 also further cools the gas so that molten products in the gas may deposit on parts of the filter. In addition, the final filter 124 may comprise reactive sites of an acidic oxide, such as silicon dioxide, capable of reacting with and neutralizing the sodium oxide in the hot gas stream. This reaction produces small particles of products such as silicates, which must be captured by the final filter 124.

The final filter 124 comprises a plurality of layers of material wound in the form of a ring. The ring is formed by wrapping the layers on a cylindrical mandrel (not shown). The layers are first preassembled in a strip. The strip is then wound on the cylindrical mandrel. The outermost layer, which is a metal mesh, is wound so that it overlaps itself. The overlapping portions of the outermost layer are then tack welded together to form a tight annular filter assembly. The filter 124 can then be removed from the mandrel and does not unwrap.

The final filter 124, as shown in FIG. 4, has nine layers. From the inside out, in the direction of gas flow, the first three layers 150 comprise a 28 mesh metal cloth, i.e., the mesh has 28 strands per inch in both the warp and weft directions. The fourth layer 152 is a 24×110 mesh metal cloth having 24 strands per inch in the weft direction and 110 strands per inch in the warp direction. The first three layers 150 function primarily as a heat sink. The fourth layer 152 has smaller openings than the first three layers. It functions primarily to entrap medium size particulates from the hot gas stream which are not removed in the prefilter 120 or slag screen 122. A suitable metal mesh for the three layers 150 and the layer 152 is stainless steel mesh. The layers 150 and the layer 152 could be made of other metals, for instance, carbon steel, nickel, copper, titanium, chromium and/or aluminum.

The fifth layer 154 of the final filter 124 is a ceramic fiber mat comprising a mixture of aluminum oxide and silicon dioxide marketed by Sohio Carborundum, Inc. under the trademark "Fiberfrax". The composition of the mat is at least about 47% $Al_2O_3$ and at least about 47% $SiO_2$.

Instead of "Fiberfrax", the layer 154 can also be an alumina-silica ceramic mat marketed by Thermal Ceramics under the trademark "Ultrafelt". Other ceramic fibrous mats which can be used are an alumina-silica mat marketed under the trademarks "Cerablanket" and "Cerachem" by Thermal Ceramics. "Ultrafelt" and "Cerablanket" have compositions similar to "Fiberfrax". "Cerachem" contains about 36% $Al_2O_3$, 49% $SiO_2$ and 15% $Zr_2O_3$. The function of the silicon dioxide in the mat is to react with an neutralize the sodium oxide in the gas flow, in accordance with known practice. This reaction forms small particles of sodium silicates.

Typically, the layer 154 has a relatively high density, small pore size and greater thickness than the layers 150, 152. By way of example, the following are specifications for "Fiberfrax":

| | |
|---|---|
| Density = | 9–11 lbs/ft$^3$ |
| Bulk Fiber Density = | 2.6–2.8 grams/cm$^3$ |
| Thickness = | about 0.125 inches |

The material provides a pressure drop of about 45–68 mm of $H_2O$.

The sixth layer 156 is a nickel felt material. The nickel felt is marketed by National Standard Corp. under the trademark "FIBREX". It is a non-woven felt of nickel fibers which are densely packed to define a plurality of gas flow passages of small size. A purpose of the nickel felt layer 156 is to entrap the small particles of silicates which are formed in the gas stream. Typically, the felt layer 156 will have a base weight (without a coating) of about 0.5 to one gram/in$^2$, and a thickness of about b 0.030 inches. Preferably, the nickel fibers are coated, for instance, by sintering, with particles of nickel or other inorganic material. This further constricts the size of the openings in the felt. The nickel felt can be coated on one or both sides. The ratio of the nickel felt to the coating particles can be in the range of about 100/0 to 60/40 by weight.

Whether coated or not, or coated on both sides or only one side, the nickel felt has a relatively low permeability to gas flow. For instance, a nickel felt having a base weight of about one gram/in$^2$, coated on both sides with a 60/40 ratio by weight of nickel felt to nickel particles, has a permeability of about 5.13 ft.$^3$ of gas/min/ft.$^2$. A nickel felt having a base weight of about 0.5 grams/in$^2$, coated on one side, with an 80/20 ratio by weight of nickel felt to nickel particles, has a permeability of about 220 ft.$^3$ of gas/min/ft.$^2$. The felt layer 156 can be constructed of metal fibers other than nickel capable of withstanding the temperatures and other conditions of the gas flow in the inflator. Examples of other suitable metals are stainless steel, carbon steel, copper, aluminum, titanium and chromium.

The sixth layer 156 can also comprise a nickel fiber felt, the fibers of which are coated with nickel particles and silicon dioxide particles. One example of such coating is a 60/40 ratio by weight of nickel fibers to nickel and silicon dioxide particles. The nickel particles help contain the silicon dioxide and prevent the silicon dioxide from flaking off the metal fibers. The silicon dioxide provides further reactant sites for reacting with and neutralizing the sodium oxide in the gas flow.

The outer three layers 158 are similar in construction to the inner three layers 150 and are a 28 mesh metal cloth. The purpose of the outer three layers is primarily to provide reinforcement and strength to the final filter 124.

As shown in FIG. 4, the layers 150, 152, 154, 156 and 158 of the final filter 124 have different dimensions in the vertical direction transverse to the direction of gas flow. It is understood that these dimensions can vary depending upon such factors as the volume of the inflator 10 and the amount of the gas flow. By way of example, the inner three layers 150 (FIG. 4) may have a vertical dimension in the range of about 17.8–18.6 millimeters. Ideally, the vertical dimension of all three layers 150 is the same. However, tolerances in the manufacture of the metal mesh may create some differences in the vertical dimensions, as shown. The fourth layer 152 will have a slightly smaller vertical dimension than the first three layers 150, e.g., about 17.6–18.5 millimeters.

The fifth and sixth layers 154 and 156 have somewhat greater vertical dimensions than layers 150, 152. By way of example, these two layers may have a nominal vertical dimension in the range of about 18.5–19.3 millimeters. Finally, the last three layers 158 have a nominal vertical dimension essentially the same as the vertical dimension for the first three layers 150, in the range of about 17.8–18.6 millimeters. As shown in FIG. 4, the fifth and sixth layers 154 and 156 extend, in the vertical direction, both above and below the layers 150, 152 and 158. The amounts of extension of layers 154, 156 above and below layers 150, 152 and 158, are about equal.

The layers 150, 152 made of metal mesh define, in the present invention, a first filter section. The overall thickness of the layers 150, 152 in the direction of gas flow is sufficient to provide a heat sink and entrap coarse particles. Obviously, the number of layers and their makeup can vary depending upon other aspects of the inflator. The first filter section, being of metal mesh, is one which has a relatively low resistance to gas flow.

The intermediate layers 154, 156 are made of materials of relatively small pore size and define a second filter section which has a relatively high resistance to gas flow. As with filter layers 150, 152, the make-up, thicknesses, and numbers of the layers 154, 156 can vary. However, the function of layers 154, 156 is to provide reactive sites for neutralizing sodium oxide in the gas stream and to entrap small particles of silicates. Thus, the filter layers 154, 156 define a filter section having a higher resistance to gas flow than layers 150, 152.

The layers 158 make up a third filter section. Since the function of layers 158 is to add structural strength to the final filter 124, the layers are optional. The layers 158 constitute a section of relatively low resistance to gas flow, compared to layers 154, 156.

The pressure of the gas generated within the inflator 10 after ignition of the gas generating material quickly reaches a high level, for instance, several thousand psi. The layers 154, 156 in the final filter 124, having pores of minute pore size, offer substantial resistance to the gas flow through the final filter 124. Since the layers 150, 152, 154 and 156 all provide important filtering functions, it is necessary that all of these layers are well sealed within the inflator housing 40, and that none of the layers are bypassed by the gas flow.

FIG. 3 shows the manner in which the final filter 124 of the present invention is sealed between the filter shield 126 and the diffuser cup end wall 54. An upper seal 162 is positioned between the upper edge of the final filter 124 and the housing end wall 54. A lower seal 164 is positioned between the lower edge of the final filter 124 and the filter shield 126. The seals 162 and 164 are each in the shape of a ring. A preferred seal is a "Type 5" flexible graphite seal as defined in ASTM standard F-104. One suitable graphite seal, marketed by EGC Enterprises, Inc., has a characteristic identification number, per ASTM F-104, of F527000. This is a laminated graphite seal having a compressibility of about 30%–50%.

FIG. 5A shows the relationship of the lower seal 164 to the lower edges of layers 150–158 of the final filter 124. The same relationship shown will exist with regard to the upper seal 162 and the upper edges of layers 150–158. As shown in FIG. 5A, the intermediate layers 154 and 156 are embedded into the graphite seal 164. FIG. 5A shows the layers 154, 156 embedded equal distances into seal 164. The metal felt layer 156 is a more rigid material than the ceramic mat 154. Thus, in actual practice, the ceramic mat layer 154 may be compressed somewhat, and the metal felt may become embedded into the seal 164 a greater distance than the ceramic mat 154.

FIG. 5A shows dotted lines 170, 172 and 174. These dotted lines represent material of the seal 164 which extrudes into the layers 150, 152, and 158, respectively. The layers 150, 152, and 158, being a metal mesh, have a more open structure than layers 154, 156. Thus, extrusion of the material of seal 164 into layers 150, 152 and 158 is possible. As shown in FIG. 5A, the material of seal 164 is extruded into layer 152 less than into layers 150 and 158. This is because layer 152 has a closer weave or less open structure than layers 150, 152.

To achieve the structure of FIG. 5A, the seals 162, 164 and filter 124 are first assembled in spaced aligned relationship as shown in FIG. 4. The seals 162, 164 are then placed against the upper and lower edges of the final filter 124. The seals 162, 164 and the final filter are then placed between opposed flat surfaces of a die press (not shown). The die press is closed forcing the upper and lower edges of the filter layers 154, 156 into the seals 162, 164, as shown in FIG. 5. Also, closing of the die press causes material of seals 162, 164 to extrude into layers 150, 152 and 158, as shown by the dotted lines 170, 172 and 174, FIG. 5A. This sequence of steps provides a sealing relationship between the filter 124 and the seals 162, 164. The amount of force required to establish a sealing relationship between seals 162, 164 and the filter 124 can vary depending upon the material of the seals and the makeup of the final filter 124. By way of example, using graphite seals and a plurality of filter layers as specified above, a minimum force of about 850 psi is required to achieve the sealing relationship of the component parts as shown in FIG. 5.

The subassembly of the seals 162, 164 and final filter 124 can then be tested for seal effectiveness. This can be carried out following known test procedures, for instance, by blanketing the flow path area of the filter 124 and testing for gas leakage in the interface between each seal 162, 164 and the filter.

After testing, the subassembly of the final filter 124 and the seals 162, 164 is placed in the diffuser cup 42 (FIG. 3) so that the seal 162 seats against end wall 54. The filter shield 126 is then positioned in the open end of the filter cup adjacent flange 56. The filter shield 126 has a peripheral flange 180 which makes an interference fit with the side wall 50 of the diffuser cup. The filter shield 126 is pressed into the diffuser cup until it abuts against seal 164. The filter shield 126 is then pressed further into the diffuser cup 42 so that the seals 162 and 164 seat against the end wall 54 and shield 126. The amount of force used in this step should be sufficient to cause the material of the seals 162, 164 to fill all voids between the seals and surfaces of end wall 54 and shield 126, establishing a sealing relationship with end wall 54 and shield 126. The amount of force required is dependent on the material of the seal. Using the above referenced graphite seal material, it has been determined that a minimum force of about 1,700 psi is required to establish a sealing relationship. During the application of the force to establish the sealing relationship, the layers 154, 156 may further embed into the seals 162, 164 and the material of the seals 162, 164 may further extrude into the filter layers 150, 152 and 158. The interference fit between the flange 180 of the filter shield 126 and the side wall 50 of the diffuser cup 42 maintains the component parts in the positions shown in FIG. 3. The other components are then added to the assembly and the parts are thereafter welded together at locations 70, 72, 86 and 144.

Variations in the present invention will be apparent to those skilled in the art. For instance, by incorporating silicon dioxide into the nickel felt layer 156, it is possible to form the final filter 124 without a ceramic fibrous mat such as layer 154. Also, the numbers and mesh sizes for the filter screens 150, 152 and 156 can be varied. These and other variations can be made to control the gas output of the inflator as desired.

From the above description of the invention, those skilled in the art will perceive improvements, changes and modifications in the invention. Such improvements, changes and modifications within the skill of the art are intended to be covered by the appended claims.

Having described the invention, the following is claimed:

1. A method of assembling an inflator for a vehicle occupant restraint which inflator comprises a housing providing a gas flow path, a filter comprising a plurality of successive filter layers extending across the gas flow path, and a seal between the housing and the filter, said method comprising the steps of:
   preassembling said seal and filter by embedding a part of the filter into the material of the seal to provide a sealing relationship between the seal and the filter; and
   thereafter, positioning the preassembled filter and seal in the housing.

2. The method of claim 1 wherein said seal is a graphite seal.

3. The method of claim 2 wherein said part of the filter embedded into the material of the seal comprises a layer of metal felt.

4. The method of claim 3 wherein said metal felt is coated with metal and/or ceramic particles sintered to the metal felt.

5. The method of claim 3 wherein said part of the filter also includes a porous ceramic mat layer adjacent the layer of metal felt.

6. The method of claim 5 wherein said porous ceramic mat comprises fibers of silicon dioxide and aluminum oxide.

7. The method of claim 3 wherein said filter comprises a plurality of layers of metal mesh which are adjacent said layer of metal felt, and said step of assembling includes the step of extruding the material of the seal into the layers of the metal mesh.

8. The method of claim 3 wherein said filter is a filter ring having opposite edges and said seal is a ring pressed into sealing engagement with one of said opposite edges.

9. A method of assembling an inflator for a vehicle occupant restraint, which inflator comprises a housing providing a gas flow path, a filter comprising a plurality of successive filter layers extending across the flow path, and a seal between the housing and the filter, said method comprising the steps of:
   preassembling said seal and filter by embedding a part of the filter into the material of the seal to provide a sealing relationship between the seal and the filter;
   testing the preassembled filter and seal for seal effectiveness; and
   thereafter, positioning the preassembled filter and seal in the housing.

10. The method of claim 9 wherein said seal is a graphite seal.

11. The method of claim 10 wherein the part of the filter embedded into the material of the seal comprises a layer of metal felt.

12. The method of claim 11 wherein said metal felt is coated with metal and/or ceramic particles sintered to said metal felt.

13. The method of claim 12 wherein said filter comprises a plurality of layers of metal mesh which are adjacent said layer of metal felt, and said step of assembling includes the step of extruding the material of the seal into the layers of the metal mesh.

14. A method of assembling an inflator for a vehicle occupant restraint comprising the steps of:
   (a) providing a housing defining a gas flow path;
   (b) providing an annular filter including a plurality of successive filter layers adapted to extend across said gas flow path, said annular filter having opposite annular edges;
   (c) preassembling the filter and a pair of seals by embedding a part of each of the opposite annular edges of the filter into the material of a respective seal to provide a sealing relationship between the seals and the opposite edges of the filter;
   (d) testing the preassembled filter and seals for seal effectiveness; and
   (e) thereafter positioning of the preassembled filter and seals in said housing 15. The method of claim 14 wherein each of said seals is a graphite seal.

16. The method of claim 15 wherein the part embedded into the material of the seals comprises a layer of metal felt, said layer of metal felt having portions projecting at each of the opposite annular edges of the filter beyond the other layers of the filter.

17. The method of claim 16 wherein said metal felt is coated with metal and/or ceramic particles sintered to said metal felt.

* * * * *